United States Patent Office 3,485,288
Patented Dec. 23, 1969

3,485,288
METHOD OF MAKING A MOLD FOR CASTING OF REFRACTORY AND REACTIVE METALS
Ralph H. Zusman, Tigard, and Lawrence E. La Voie, Portland, Oreg., assignors to Precision Castparts Corp., Portland, Oreg., a corporation of Oregon
No Drawing. Filed Mar. 13, 1967, Ser. No. 622,431
Int. Cl. B22c 9/04, 1/22
U.S. Cl. 164—34                                 4 Claims

ABSTRACT OF THE DISCLOSURE

Shell mold for precision casting of refractory and reactive metals is formed by investing expendable pattern with dipcoat layer comprising graphite flour and a furan resin and reinforcing such layer with alternate layers of graphite stucco and mixtures of graphite flour and a furan resin. After removal of pattern, the shell is baked to carbonize the resin. The interstices of the mold innerface of the baked shell are then filled with a liquid furan resin and the shell rebaked to carbonize the adhering resin and seal the mold innerface to form a strong, essentially non-porous innerface having a smooth surface for receiving the metal to be cast.

BACKGROUND OF INVENTION

Casting of refractory and reactive metals such as, for example, titanium, zirconium, hafnium, molybdenum and wolfram and also certain high alloy steels has given difficulty because they react with many materials in their molten state to form undesirable alloys or compounds which impair the qualities of the metal. Certain mold materials have tended to erode under the high temperature of casting and others have not had the necessary thermal stability. Various processes have been proposed for forming graphite molds since graphite has numerous desirable properties.

SUMMARY OF THE INVENTION

The present invention has for an object the provision of a graphite shell mold that will faithfully conform to the configuration of the expendable pattern, that is essentially non-porous, that will present to and cause the cast metal to have a surface of desirable smoothness, and in which the graphite is strongly bonded as to minimize the solution of the graphite by the hot cast metal.

In accordance with the invention, the mold is formed by dipping an expendable pattern in a dipcoat mixture comprising graphite flour and an acid catalyzed unmodified furfuryl alcohol polymer resin with an alcohol dilutant. The dipcoat layer is reinforced with alternate layers of graphite stucco and backup layers of mixtures of graphite flour and acid catalyzed unmodified furfuryl alcohol polymer resin in an alcohol dilutant. The shells have high green strength as a result of the air setting of the resin which facilitates their handling with a minimum of breakage. When the desired shell thickness is reached, the shell is fired to carbonize the resin. The shell may be used for some purposes at that point, but preferably the interstices of the mold innerface are filled with a carbonizable material such as an organic resin. An unmodified furfuryl alcohol polymer resin is desirably utilized. After firing to carbonize the adhering resin, a hard, dimensionally stable mold is formed which is especially suitable for casting of refractory and reactive metals to close tolerances and with desirably smooth surfaces.

DESCRIPTION OF PREFERRED EMBODIMENTS

In accordance with the present invention, an expendable pattern of the shape to be cast is first formed of wax or other suitable material which can be removed from the completed mold by melting, vaporization, or by use of a heated solvent in customary manner. The patterns may comprise the configuration of a single element to be cast, or may comprise an assembly or cluster pattern of a plurality of elements.

The pattern is first provided with a face coating comprising a mixture of graphite flour and an acid catalyzed unmodified furfuryl alcohol polymer resin. A preferred composition is set forth in Example I.

Example I

|  | Percent by weight |
| --- | --- |
| Unmodified furfuryl alcohol polymer resin | 4.0 |
| Denatured ethyl alcohol | 13.0 |
| —200 U.S. mesh graphite flour | 82.5 |
| Hydrochloric acid commercial grade | 0.5 |

A suitable unmodified furfuryl alcohol polymer resin is sold under the trademark CHEM REZ 280. This resin is nitrogen-free, is a liquid, and is catalyzed upon mixing with mineral acids to polymerize at room temperature to a solid phase. The amount of resin in the face dipcoat composition may vary between 0.5 to 6.0 percent by weight of the dipcoat composition, the preferred range being between 2.5 and 4.5 percent.

The graphite flour may vary between about 78 and 90 percent by weight of the dipcoat composition. Where a smooth surface texture of the finished casting was not important, graphite flour of less fineness than —200 mesh could be utilized.

To catalyze the resin other mineral acids such as, for example, sulfuric acid and phosphoric acid may be utilized. The amount of acid utilized may vary depending upon the type and its concentration. The amount of commercial grade hydrochloric may be varied, for example, between 0.1 and 0.6 percent.

The catalyzed resin normally tends to set up relatively rapidly having a shelf life of only about one half hour. We have found, however, that diluting the catalyzed resin with certain alcohols is effective in retarding the polymerization and lengthening the shelf life for periods of up to about seven days. Ethyl and isopropyl alcohol are effective for this purpose. Methyl alcohol is less satisfactory since it is not as effective a retardant. The use of alcohol also enables higher acid concentration to be incorporated which results in a harder resin giving the shell greater dimensional stability.

The face dipcoat is most easily applied by simply dipping the pattern in the coating mixture. After draining a graphite stucco is applied to the dipcoat while it is still wet. This may be applied by immersing the coated pattern in a fluidized bed of graphite particles, or other suitable manner. Preferably, the stuco comprises graphite particles of —35 +60 U.S. mesh size.

After applying a stucco coat, the pattern is set aside to dry. The alcohol evaporates rapidly at room temperature and the catalyzed resin rapidly hardens. The drying time can be controlled to some extent by controlling the temperature, humidity, and the air-movement over the pattern. At 70° F. and 40 percent relative humidity with no air circulation the minimum drying period is about six hours.

When the face dipcoat has hardened a further coating of graphite and resin is applied by dipping the pattern in a liquid mixture thereof. A preferred composition of the backup coating is set forth in Example II.

Example II

| | Percent by weight |
|---|---|
| Unmodified furfuryl alcohol polymer resin | 16 |
| −200 mesh graphite flour | 17 |
| −35 mesh graphite flour | 32 |
| Hydrochloric acid, commercial grade | 4 |
| Ethyl or isopropyl alcohol | 31 |

CHEM REZ 280 is a suitable resin for the backup coat. The amount of resin in the backup mixture may vary between 10 and 25 percent by weight of the backup coat composition, but preferably the resin is maintained between 14 and 18 percent.

The relative amounts of course and fine graphite may be varied somewhat. The amount of −200 mesh graphite may vary between about 15 and 19 percent by weight of the backup coating composition and the amount of −35 mesh graphite may vary between about 30 and 34 percent. It is preferred that the −200 mesh graphite and −35 mesh graphite be in a ratio of about 1:2.

Again, instead of hydrochloric acid other mineral acids may be utilized as a catalyst, the amount varying with type and concenration. In the case of commercial grade hydrochloric, the amount of acid should be between about 1 and 8 percent by weight of the backup coating mixture, and preferably between about 2 and 6 percent.

In place of ethyl alcohol isopropyl alcohol may be utilized and, of course, the alcohol has the same retarding effect on resin set-up time as in the case of the dipcoat composition. If retarding of set-up time is not required, methyl alcohol can be utilized.

After dipping in the backup dipcoat composition, the pattern is again stuccoed with −33 +60 graphite particles and the resin coating permitted to dry and harden. At 70° F. and 40 percent relative humidity drying time should be three hours at least. Additional dips in the backup coating composition and stuccoing are thereafter carried out until a wall of desired thickness is built upon the pattern.

After the final backup coat has hardened, the pattern is removed by any suitable process as, for example, heating the mold and pattern to melt a wax pattern, or by removing it by dissolving the pattern in a solvent, or by other suitable process. The remaining shell is then fired to drive off the volatiles and convert the resin binder to carbon. Firing must be carried out in vacuum or in a reducing or an inert atmosphere and is accomplished by heating the shell for a period of between 5 to 20 hours at a temperature of between 1800° F. to 2400° F., the period of heating being inverse to the temperature. Before removal of the mold shell from the protective atmosphere its temperature must be lowered below 800° F. to prevent oxidation of the graphite.

For some purposes the mold may be utilized at this point for casting certain metals such as stainless steels. Preferably, however, the mold is treated so that the interstices in the mold innerface are filled with carbonaceous material to seal the surface. This is accomplished in accordance with the invention by filling the interstices with a liquid organic material which will decompose upon heating to a stable carbonaceous material. A preferred material is CHEM REZ 280. The interstices may be filled by filling the mold with the liquid and pouring it out almost immediately to prevent excessive absorption. The mold is then dried and alternately filled and dried several times until the mold surface will absorb no more liquid. The mold is then again fired for from one to eight hours in a protective atmosphere, and at a temperature between 1800° F. and 2400° F., the temperature being inverse to the period of firing.

A cast may be made in the mold immediately upon completion of the second firing and, as is customary, such cast should be made in vacuum or in inert or reducing atmosphere. The mold may, of course, be stored after cooling, for casting at a later time.

After the cast has cooled the shell mold may be removed by jolting, sand blasting, etc. The shell separates readily from the metal leaving a clean, shiny, smooth surface.

Having illustrated and described a preferred embodiment of the invention, it should be apparent to those skilled in the art that the invention permits of modification in arrangement and detail. We claim all such modifications as come within the true spirit and scope of the appended claims.

We claim:
1. The method of making a mold for casting of refractory metals which comprises the steps of applying to a suitably expendable pattern a dipcoat comprising a mixture of:
   an unmodified furfuryl alcohol polymer resin,
   graphite flour, an alcohol selected from the class consisting of methyl, ethyl and isopropyl alcohols, and
   a mineral acid catalyst
to form a coating on said pattern; while wet applying to said coating a coat of graphite stucco; thereafter applying over said stucco a backup coat comprising:
   an unmodified furfuryl alcohol polymer resin,
   graphite flour, an alcohol selected from the class consisting of methyl, ethyl and isopropyl alcohols, and
   a mineral acid catalyst
and alternately applying said stucco coats and backup coats to form a mold of desired wall thickness.

2. The process of claim 1 wherein said dipcoat mixture comprises between about:
   2.5 to 4.5 percent unmodified furfuryl alcohol polymer resin,
   78.0 to 90.0 percent graphite flour of −200 mesh,
   0.1 to 0.6 percent mineral acid, and
   the balance alcohol;
said graphite stucco comprises −35 mesh; and said backup coat mixture comprises between about:
   14 to 18 percent unmodified furfuryl alcohol polymer resin,
   15 to 19 percent graphite flour of −200 mesh,
   30 to 34 percent graphite flour of −35 mesh,
   2 to 6 percent mineral acid catalyst, and
   the balance alcohol.

3. The method as set forth in claim 1 including the steps of removing said pattern from said mold, and firing said mold in a non-oxidizing atmosphere at a temperature in excess of 1800° F.

4. The method as set forth in claim 1 including the steps of cooling said mold after firing,
   sealing the innerface of the cooled mold with a carbonizable organic compound,
   and firing the sealed mold in a non-oxidizing atmosphere at a temperature in excess of 1800° F.

References Cited

UNITED STATES PATENTS

| 3,256,574 | 3/1965 | Lirones | 164—24 |
| 3,321,005 | 5/1967 | Lirones | 164—26 |

FOREIGN PATENTS

| 573,760 | 4/1959 | Canada. |

J. SPENCER OVERHOLSER, Primary Examiner

R. SPENCER ANNEAR, Assistant Examiner

U.S. Cl. X.R.

164—43

PO-1050
(5/69)

UNITED STATES PATENT OFFICE
CERTIFICATE OF CORRECTION

Patent No. 3,485,288    Dated December 23, 1969

Inventor(s) Ralph H. Zusman and Lawrence E. La Voie

It is certified that error appears in the above-identified patent and that said Letters Patent are hereby corrected as shown below:

Column 2, line 58, "stuco" should be --stucco--; column 3, line 14, after "between" insert --about-- and column 3, line 37, "33" should be --35--

SIGNED AND
SEALED
JUN 9 1970

(SEAL)
Attest:

Edward M. Fletcher, Jr.
Attesting Officer

WILLIAM E. SCHUYLER, JR.
Commissioner of Patents